UNITED STATES PATENT OFFICE.

AUGUSTINE L. FROST, OF CHICAGO, ILLINOIS.

ART OF BREAD-MAKING.

1,254,494.     Specification of Letters Patent.    Patented Jan. 22, 1918.

No Drawing. Application filed December 1, 1914, Serial No. 875,003. Renewed July 5, 1917. Serial No. 178,819.

*To all whom it may concern:*

Be it known that I, AUGUSTINE L. FROST, a citizen of the United States, residing at Chicago, in the county of Cook and State of Illinois, have invented a new and useful Improvement in the Art of Bread-Making, of which the following is a specification.

My invention relates to an improvement in the art of making bread of whole-cereal flour (wheat or rye), meaning flour that has not been bolted, but is the product of merely grinding the cereal to the desired degree of fineness to produce a flour containing all of the cereal's constituents. I have especially devised my invention for making the whole-wheat variety of bread, and therefore confine thereto the description hereinafter contained, although it is to be understood that rye may be substituted for wheat in employing my process in making rye bread.

A common practice of making whole-wheat bread is to mix the flour and sour milk, or butter milk, with salt and yeast added, and after kneading the dough and subjecting it to the raising action of the yeast, dividing it into loaves and baking it. This dough is so dense that the heat of baking fails to adequately penetrate into the center of the loaf to thoroughly bake through it to kill the yeast and drive out the moisture therein. In fact, if the baking be continued sufficiently long to effect such thorough baking, the crust is rendered unduly thick and hard. In consequence of the inadequately baked and moist condition of the loaf in its central portion, as stated, the yeast therein is not killed by the heat, so that the bread will not keep in warm weather, but it sours by fermentation in the central part of the loaf and thus renders the latter unfit for eating. It is not practicable, therefore, either for bakers to bake this bread in the ordinary way referred to in warm climates, or in warm weather, for trade-distribution, nor even for householders to so bake it for the domestic supply.

The object of my invention is to overcome the objections referred to and provide whole-wheat bread that will not sour in warm weather.

To produce my improved article, the preferred procedure is the following in making a batch of dough for baking, say, four loaves in a pan of that capacity:

I employ the following ingredients for mixture with the flour:

Vegetable oil _____ 3 oz.
Yeast _____ ¾ oz.
Sugar (granulated white) __ 2 oz.
Salt (common table) _____ ¾ oz.
Sour or butter milk _____ 4 lbs.

The vegetable oil used is preferably olive or cotton-seed oil, or a mixture of the two; and instead of using the milk alone I prefer to dilute it with an equal portion of water, thus using 2 lbs. (1 quart) each of the milk and water.

The oil, sugar, salt and yeast are stirred together and added to and thoroughly mixed with the water and milk. The whole is then introduced into a receptacle containing 6 pounds, or thereabout, of coarsely-ground whole-wheat flour and mixed with the latter to produce a dough, which is thoroughly and carefully kneaded. This dough is formed into loaves (four in number for the amount of the batch specified), and these loaves are introduced into a pan of the proper capacity. The filled pan is first introduced into a "proofing" oven, wherein it is steamed and remains for about three-quarters of an hour under a temperature of about 80 to 100 degrees F. All the raising of the bread by the yeast fermentation takes place in this proofing step. Thereafter, the bread is placed, in the pan, in a bake-oven, and it is baked for about one and one-quarter hours in a temperature of 425 to 450 degrees F. and then taken out and cooled off, in the atmosphere, for about five hours, before it is ready for eating.

The bread thus prepared keeps from souring and remains palatable and wholesome for an indefinitely long time in a warm climate or during warm weather. The non-souring, referred to, is believed to be due, as a theory, to the following conditions:

The oil in the dough shields the fermentable matter in the cereal against action thereon of the yeast, which can thus only feed upon and convert the sugar to raise the bread in the proofing oven. Any of the yeast contained in the central part of the baked loaf that escapes destruction by the heat of baking continues inactive because of the shielding effect, referred to, of the oil, and that portion of the loaf therefore remains sweet, the same as the remainder of the loaf.

While the weight of the flour alone for a batch of four loaves is about 6 lbs., as stated, and the weight of each finished loaf only slightly exceeds 2 lbs., the loss by evaporation in the baking is thus about 2 lbs.

What I claim as new and desire to secure by Letters Patent is:—

1. The process of making bread, which consists in preparing a dough with coarsely-ground whole-cereal flour and a mixture containing sour milk, vegetable oil, sugar, salt and yeast, kneading the dough, and thereupon proofing and finally baking it.

2. The process of making bread, which consists in preparing a dough with coarsely-ground whole-cereal flour and a mixture of sour milk and water, vegetable oil, sugar, salt and yeast, kneading the dough, and thereupon proofing and finally baking it.

3. The process of making bread, which consists in preparing a mixture of vegetable oil, in the proportion of about 3 oz., sugar, about 2 oz., salt and yeast, about ¾ oz. each, and water-diluted sour milk, about 4 lbs., mixing the same with about 6 lbs. of coarsely-ground whole-cereal flour to form a dough, kneading the dough and thereafter subjecting it to a proofing heat with steam, and baking the dough.

4. As a new article of manufacture, a kneaded dough for baking into bread, made of coarsely-ground whole-cereal flour and a mixture containing sour milk, vegetable oil, sugar, salt and yeast, substantially in the proportions specified.

AUGUSTINE L. FROST.

In presence of—
F. M. RONDEAU,
A. C. FISCHER.